United States Patent
Hauck-Stattelmann et al.

(10) Patent No.: US 10,890,887 B2
(45) Date of Patent: Jan. 12, 2021

(54) PLATFORM FOR CONTINUED USE OF EXISTING SOFTWARE FOR THE ACTUATION OF INDUSTRIAL FIELD DEVICES

(71) Applicant: ABB Schweiz AG, Baden (CH)

(72) Inventors: Stefan Hauck-Stattelmann, St. Leon-Rot (DE); Stephan Sehestedt, Mannheim (DE); Jeffrey Harding, Holly Springs, NC (US); Heiko Koziolek, Karlsruhe (DE)

(73) Assignee: ABB SCHWEIZ AG, Baden (CH)

( * ) Notice: Subject to any disclaimer, the term of this patent is extended or adjusted under 35 U.S.C. 154(b) by 93 days.

(21) Appl. No.: 16/251,183

(22) Filed: Jan. 18, 2019

(65) Prior Publication Data

US 2019/0171177 A1    Jun. 6, 2019

Related U.S. Application Data

(63) Continuation of application No. PCT/EP2017/068279, filed on Jul. 19, 2017.

(30) Foreign Application Priority Data

Jul. 19, 2016   (EP) ..................................... 16180179

(51) Int. Cl.
   *G05B 19/04*   (2006.01)
   *G05B 19/042*  (2006.01)
   (Continued)

(52) U.S. Cl.
   CPC ......... *G05B 19/0426* (2013.01); *G05B 15/02* (2013.01); *G05B 19/058* (2013.01);
   (Continued)

(58) Field of Classification Search
   CPC .. G05B 19/0426; G05B 15/02; G05B 19/058; G05B 19/4185; G05B 23/0272
   See application file for complete search history.

(56) References Cited

U.S. PATENT DOCUMENTS 5,307,346 A      4/1994  Fieldhouse
10,536,526 B2 *  1/2020  Gustin .................... H04L 67/12
(Continued)

FOREIGN PATENT DOCUMENTS

DE   102007043328 A1   3/2009
DE   102008019053 A1   10/2009
(Continued)

*Primary Examiner* — Henry Tsai
*Assistant Examiner* — Christopher A Daley
(74) *Attorney, Agent, or Firm* — Leydig, Voit & Mayer, Ltd.

(57) ABSTRACT

A platform for actuation of at least one industrial field device in an industrial installation having control software includes: an execution environment, in which the control software is runnable; and an external interface for communicating between the control software and the at least one industrial field device. The execution environment has virtual hardware which, from a point of view of the control software, behaves in a manner of the at least one industrial field device. A switching unit is connected between the virtual hardware and the external interface. The switching unit bidirectionally translates data, interchanged between the control software and the virtual hardware, for communication with the at least one industrial field device via the external interface.

17 Claims, 2 Drawing Sheets

(51) Int. Cl.
　　　*G05B 15/02*　　　(2006.01)
　　　*G05B 19/05*　　　(2006.01)
　　　*G05B 19/418*　　(2006.01)
　　　*G05B 23/02*　　　(2006.01)

(52) U.S. Cl.
　　　CPC ..... *G05B 19/4185* (2013.01); *G05B 23/0272* (2013.01); *G05B 2219/13125* (2013.01); *G05B 2219/14006* (2013.01); *G05B 2219/25011* (2013.01); *G05B 2219/31088* (2013.01); *G05B 2219/31093* (2013.01); *Y02P 90/02* (2015.11)

(56) References Cited

U.S. PATENT DOCUMENTS

| | | |
|---|---|---|
| 2004/0139264 A1 | 7/2004 | Gros et al. |
| 2008/0172857 A1* | 7/2008 | Brinkworth ............ B25J 9/0084 29/559 |
| 2010/0287277 A1 | 11/2010 | De Groot et al. |
| 2012/0209411 A1 | 8/2012 | Ohkado et al. |
| 2014/0122754 A1 | 5/2014 | Gutermuth et al. |
| 2014/0269744 A1 | 9/2014 | Flanders et al. |
| 2015/0378328 A1* | 12/2015 | Gustin ................... H04L 67/12 700/9 |
| 2017/0060379 A1* | 3/2017 | Capozella ............. G06T 19/006 |

FOREIGN PATENT DOCUMENTS

| | | |
|---|---|---|
| DE | 102011107318 A1 | 1/2013 |
| EP | 2306256 A2 | 4/2011 |
| EP | 2642360 A1 | 9/2013 |
| EP | 2682829 A2 | 1/2014 |
| WO | WO 2004010645 A1 | 1/2004 |

\* cited by examiner

PLATFORM FOR CONTINUED USE OF EXISTING SOFTWARE FOR THE ACTUATION OF INDUSTRIAL FIELD DEVICES

CROSS-REFERENCE TO PRIOR APPLICATION

This application is a continuation of International Patent Application No. PCT/EP2017/068279, filed on Jul. 19, 2017, which claims priority to European Patent Application No. EP 16180179.0, filed on Jul. 19, 2016. The entire disclosure of both applications is hereby incorporated by reference herein.

FIELD

The invention relates to the field of programmable logic controllers for actuating industrial field devices.

BACKGROUND

Programmable logic controllers (PLC's) or other automation technology control units are used for monitoring and controlling many industrial processes. Such devices are specialized computers running software specifically developed for the respectively actuated or monitored field device. In part, the software is even specific to the industrial installation in which the field device is used.

The software is closely interwoven with the operating system and hardware drivers of the control unit on which it runs, because all data communicated from or to the field device must pass the control unit. This has the consequence that exchanging the control unit for another model or a substantial change to the communication system (for example, I/O system, fieldbus, or other network) between the control unit and the field device in each case necessitates manual adaptation of the software. In this respect, it must be ensured that the software still has the same functionality as before, even after the adaptation. Especially in safety-relevant applications, all changes are subject to mandatory testing. The effort required for this purpose can cause higher costs than the actual hardware exchange. The advantages that can be achieved with the modernization of an industrial control system are soured by this additional expenditure. It is, correspondingly, difficult to sell such modernization to the user.

From U.S. Pat. No. 5,307,346 A is known an interface that bidirectionally translates a unified communication protocol used in a network of an industrial installation, such as the manufacturing automation protocol (MAP), into various communication standards for actuating field devices. Changes in the network between this interface and the field device may be masked with respect to the control software that still addresses the interface via MAP. The binding of the control software to the hardware of the control unit remains unaffected thereby.

SUMMARY

In an embodiment, the present invention provides a platform for actuation of at least one industrial field device in an industrial installation having control software, comprising: an execution environment, in which the control software is runnable; and an external interface configured to communicate between the control software and the at least one industrial field device, wherein the execution environment has virtual hardware which, from a point of view of the control software, behaves in a manner of the at least one industrial field device, and wherein a switching unit is connected between the virtual hardware and the external interface, the switching unit being configured to bidirectionally translate data, interchanged between the control software and the virtual hardware, for communication with the at least one industrial field device via the external interface.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
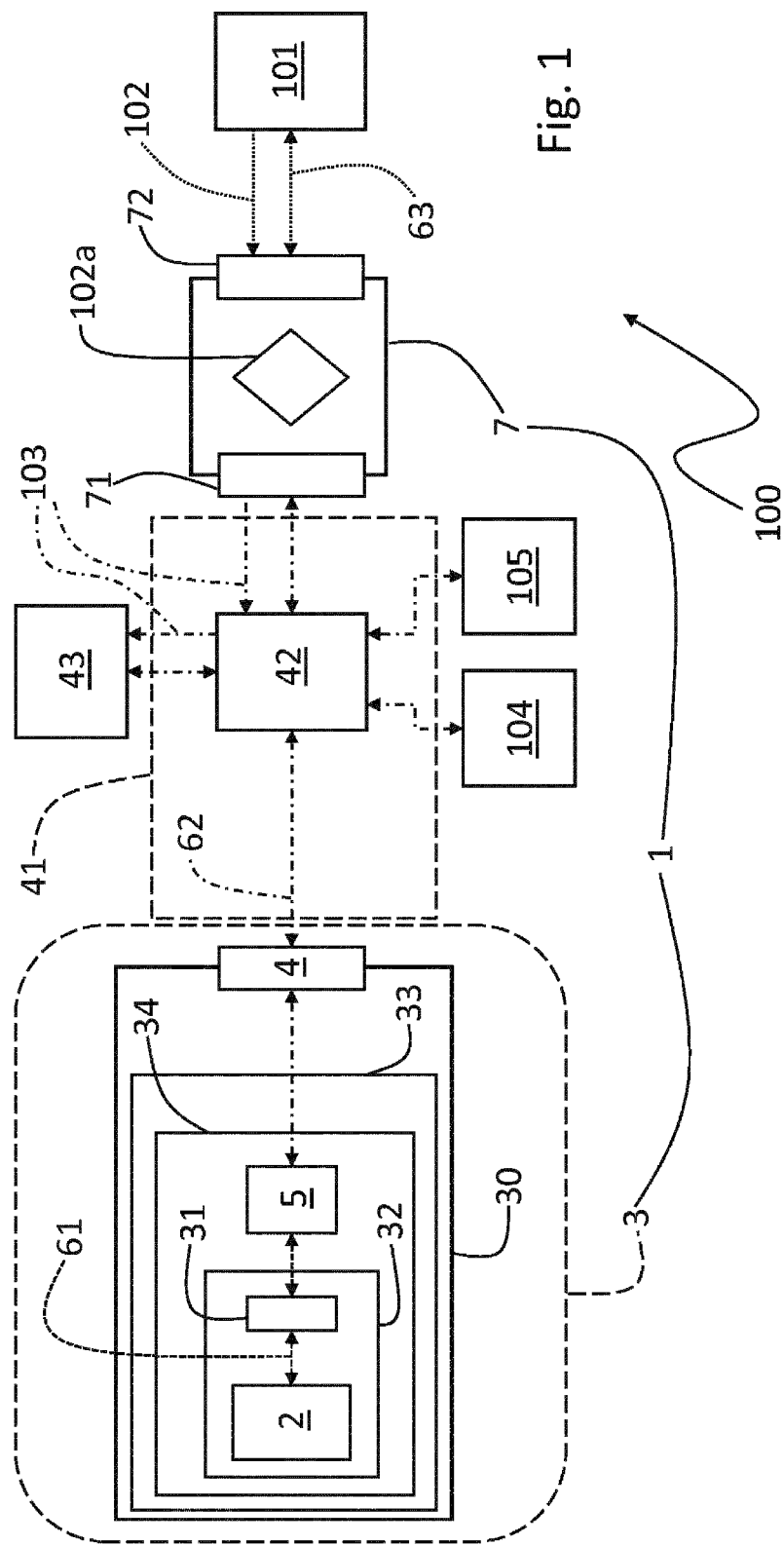
FIG. 1: Industrial installation 100 with platform 1 according to the invention.

It is therefore the aim of the invention to allow continued use of the existing control software without adaptations, even after a change in the hardware of the control unit via which the field device is actuated.

This aim is achieved according to the invention by a platform as described herein and by an associated computer program product.

Within the framework of the invention, a platform for actuating at least one industrial field device in an industrial installation with control software was developed. This platform comprises an execution environment, in which the control software can run, and an external interface for communication between the control software and the field device.

According to the invention, the execution environment has virtual hardware that, from the point of view of the control software, behaves in the manner of the field device. A switching unit is connected between the virtual hardware and the external interface. This switching unit is configured to bidirectionally translate data, interchanged between the control software and the virtual hardware, for communication with the field device via the external interface. In this case, the switching unit is generally not a simpler protocol adapter with a 1:1 translation, but takes into account the semantic meaning of the data fields in the language spoken between the virtual hardware and the control software on the one hand, and in the language spoken via the external interface on the other.

For example, the execution environment may provide a virtualized operating system corresponding to the operating system for which the control software was developed. Control software compiled as binary code for a particular control unit can then be executed without modification in the execution environment. Alternatively or in combination, the execution environment may provide program libraries (API's) which newly implement the semantics of the language in which the control software was originally written, i.e., in the event of a function call from the control software, perform exactly the function which is executed on the original platform in case of this function call. For example, the execution environment may also provide an interpreter for an interpreter language in which the control software is written. This interpreter can then execute control software present in the form of source text and, to this extent, implement the interpreter language. The execution environment can, in particular, be realized as a portable software component. The control software may consist of several control programs or control loops.

The virtual hardware is specific to the field device to be actuated by the control software. It can be present, for example, as a device driver in the virtualized operating system.

It was realized that the platform according to the invention decouples the control logic, which is contained in the control software and specific to the particular application, from the hardware of the control unit and from the type of network connection to the field device. All adaptations to the hardware of the control unit can be combined in the execution environment. All adaptations with respect to the network connection to the field device can be combined in the switching unit. Thus, if the control software is to be migrated with unchanged function to new hardware, or the field device is to be connected via a different type of network, it is no longer necessary, in contrast to the prior art, to change a monolithic program in which the actual control logic is mixed with hardware and network access instructions. Instead, only the execution environment and/or the switching unit must be adapted in each case.

These adaptations also require effort. However, it was realized that this effort is significantly reduced by the modular structure according to the invention, since, in particular, the tests required in each case become more manageable. It was furthermore realized that such adaptations are generic, i.e., can often be reused for other projects: The execution environment is initially only specific to the type of control unit for which the control software was written. Ideally, only the virtual hardware contained therein, which may, for example, be present as a driver, is specific to the actuated field device. The switching unit can, in turn, be specific to the combination of a specifically actuated field device and a communication standard used for connection via the external interface, but is independent of the type of control unit for which the control software was written. Thus, a kit with prefabricated elements can be created, from which, for the specific case of an application where specific control software shall continue to be used for a specific field device on a specific type of control unit, the solution can be assembled in each case.

The adaptation of control software to a new control unit thus ultimately changes from a very labor-intensive and error-prone individual production to a multi-purpose abstract tool, which can accordingly also be sold separately as a product or as a service.

In each specific application, the invention in turn significantly reduces the costs for the migration of control software from one control unit to another and for changes in the network connection to the field device.

This even makes it economical in many cases to perform such a migration—for instance, to a new version of the control system. According to the prior art, the effort for the migration of the control software was a great obstacle to such migrations, especially since the adaptation of the control software often required knowledge that only existed in the user himself and could therefore not be purchased, or only be purchased to a limited extent as external service. On the one hand, additional functionality can be gained by migrating to a new control unit. On the other hand, maintenance costs for obsolete control units can be saved.

Industrial control systems are typically projected to have a life span of several decades. Not every manufacturer of control units guarantees availability of devices of the same type in case of defects over such long periods of time. According to the prior art, such a defect could impose on the user the need to adapt the control software to a new control unit from one day to the next. This was partially circumvented by purchasing an obsolete control unit from remainders of stock or even on the second-hand market at an inflated price. In the case of such defects, the invention makes it possible to integrate the current mainstream control unit into the existing control system at a significantly better cost-benefit ratio.

Within an industrial installation, the invention makes it possible to standardize the hardware for control units and to thus reduce the costs for procurement and maintenance.

In a particularly advantageous embodiment of the invention, the execution environment comprises a virtual machine, which in turn runs on hardware in a manner mediated by an operating system. This makes it possible to operate several such virtual machines side-by-side, even on one and the same hardware, and to thus consolidate, for example, several control units into a powerful industrial PC. Furthermore, such machines can be monitored, stopped, started, or reconfigured in a simple manner via a management layer. Ultimately, a virtual machine also offers maximum flexibility with regard to the control software running therein. For example, the control software may be dependent upon particular old system software which, in turn, no longer runs on current control units due to lack of hardware drivers. In a virtual machine, the old system software may still be used.

The virtual hardware, the switching unit, and/or the virtual machine advantageously interact with the operating system via an additional abstraction layer. All adaptations that become necessary when using different operating systems can then be bundled in this abstraction layer. It then becomes easier to provide the platform for different operating systems on different hardware architectures. The adaptations to be performed in the abstraction layer are more comprehensible than corresponding adaptations directly in the virtual hardware, in the switching unit, and/or in the virtual machine, where the accesses to the operating system to be changed are each mixed with instructions for the internal logic of the respective component.

The execution environment may, for example, be designed to execute control software, which is present in a standardized language according to IEC 61131-3 or in a proprietary control program language—in particular, ASEA Master Programming Language or Taylor Control Language. The support for further control program languages can be added abstractly by appropriate adaptation of the execution environment, without specific control software having to be present for this purpose.

In a further, particularly advantageous embodiment of the invention, an additional gateway is provided, which is connected via a first interface to the external interface, and via a second interface to the field device. In this way, the communication standard with which the field devices are directly addressed can be decoupled from the communication standard which is used as standard in the network of the industrial installation, for example. Accordingly, physical wirings to the field devices can continue to be used without modification, for example, while at the same time the network of the industrial installation is upgraded to a new standard. If the type of connection of a field device changes, e.g., if it is changed from a physical I/O interface to a fieldbus, all necessary adaptations may be combined in the gateway. The external interface, the execution environment, and the switching unit may remain unchanged. The control unit communicates with the field device, and thus with the process to be controlled or monitored, via a uniform, configurable data model which it shares with the gateway.

The additional gateway is thus a logical continuation of the basic idea of the invention that a change at one point in the industrial control system is to entail adaptations only at as few, precisely defined points as possible and that, at these points, there should be a minimum amount of other program code which relates to other functionalities and should remain unchanged.

Accordingly, the gateway is advantageously designed to bidirectionally translate between a communication standard of the external interface on the one hand, and a communication standard of the field device on the other.

In particular, the gateway can carry out the continuously repeating sampling of the measured data obtained by the field device, which was hitherto carried out by the control unit. The control unit is relieved in this respect; it only has to read in data queued for processing (copy-in) and transmit outputs generated by the control program (copy-out). The gateway can process the data transmitted to the external interface and, in particular, compact them, so that the transmission of the data does not generate more network load than necessary. For example, the gateway may be given a rate at which it is to deliver data to the external interface, independently of its internal sampling rate. The switching unit translates the data packets arriving from the external interface into values which the control software in the copy-in phase makes available for further processing. Conversely, in the copy-out phase, the switching unit receives data from the control software and transmits them via the external interface to the gateway at the next possible point in time. The gateway, lastly, forwards these data to the field device.

For this purpose, the gateway can, for example, be equipped with a microprocessor-based computer system and corresponding software. The interface for communication with the field device can be designed, for example, as dedicated hardware, e.g., as a field-programmable gate array (FPGA) or as an application-specific integrated circuit (ASIC) which implements a fieldbus protocol.

Advantageously, the first interface and the external interface are connected via a network to a shared communication medium. Such a network can, for example, be an Ethernet network. Connections between several subscribers in these networks are typically logical connections that do not break off immediately when one of the subscribers is physically disconnected from the network. For example, the gateway, the external interface, the field device, or other components can thus be changed without the controlled industrial process necessarily coming to a standstill. The process must only be able to manage the fact that no data flow for a short period of time.

The gateway can be equipped with further functionalities for data analysis, which are otherwise usually carried out by control units. In this way, these functionalities can be added to the existing process without, from the point of view of the existing control software, a change taking place. For example, processed data can be forwarded via the network to other locations in the industrial installation.

The introduction of the gateway facilitates later extensions of the industrial control system. Both the network between the gateway and the external interface, and the network between the gateway and the field device, can be replaced and extended, without the industrial process having to come to a standstill.

In a further advantageous embodiment of the invention, the gateway is additionally designed to monitor at least one measured value determined by the field device and to communicate an event via the network when the measured value meets a predetermined criterion. In this way, an error handling can, for example, be implemented in the control software, independently of the actual control logic. For example, monitoring certain range limits can subsequently be added in this way, even if the associated control program is present only as non-editable binary code.

Particularly in new developments of control software, a modularization can, furthermore, take place to the effect that protective functions which are essential for safety and which are independent of the actual control logic are moved to the gateway. In the control software on the control unit, the program code relating to the protective functions is no longer mixed with program code relating to the control logic freely selectable by the user. Each segregation of program code relating to different functions improves its maintainability and reduces the risk of adaptations relating to one function undesirably affecting other functions.

The gateway can, in particular, be designed to bidirectionally communicate with a human-machine interface (HMI) via the network. In this way, the gateway can be configured directly via the human-machine interface. Furthermore, a clear separation between the automated control by the control unit on the one hand, and manual operation via the human-machine interface on the other, can be realized, i.e., the manual operation does not have to resort to the control unit. When the control unit fails, the process thus continues to be, at least rudimentarily, manually controllable. Even a short period required to change a control unit can be bridged by manual operation.

In a particularly advantageous embodiment of the invention, the gateway is an automation technology control unit designed as a gateway by modifying the firmware to its specific functionality. For example, the control unit offered by the applicant under the name, "AC 800 M," can be used for this purpose. For example, the control unit can receive data from the field device in its usual manner, although it then no longer processes them itself, but rather forwards them via the network to the external interface of a further control unit.

On the other hand, the advantages provided by the gateway also do not require that the gateway be spaced apart from the hardware of the control unit. Both components can be implemented to be functionally separate on the same hardware platform, and thus form a new modular control unit. In a particularly advantageous embodiment of the invention, the execution environment and the gateway mediated by the same operating system therefore run on the same hardware. For example, the gateway and the execution environment may be realized as separate virtual machines. Both functions can then also be managed equally via the associated management system. In this respect, the term, "external interface," does not imply that a connection to a gateway designed as a separate device is necessarily established via the network, but only that the logical functional group of the execution environment in which the control software runs is exited.

The hardware is, advantageously, an automation technology control unit, a programmable logic controller or, in particular, an industrial PC. In comparison to a control unit or a PLC, an industrial PC is typically equipped with substantially more computing power and memory. Both resources are significantly less expensive on an industrial PC than on a control unit or on a PLC. Furthermore, a plurality of operating systems and solutions for the creation of virtual machines are available on the market for an industrial PC as host system. For example, it may therefore also be worthwhile to consolidate in an industrial PC several control units with software written for completely different hardware platforms. For certain applications, such as training, simulation, or controlling less time-critical operations, a desktop PC, a server, or a smartphone or tablet PC may also be used as hardware.

If a control unit or a PLC is used as hardware, the capacity of this control unit can, for example, be increased beyond its original design. For example, by offloading the communication with the field device to the gateway, memory and/or computing power on the control unit can be freed, which can be used for larger and/or more complex control software. Furthermore, the gateway may provide more interfaces for communication. The invention therefore also has advantages when the user is not interested in the exchange of existing control units at all, but merely wants to extend their functionality.

In a particularly advantageous embodiment of the invention, the operating system, by the mediation of which the virtual machine runs on the hardware, is real-time-capable. In this way, despite the virtualization, response times can be guaranteed, as was possible with the direct execution of the control software on the hardware of the control unit. Advantageously, the network connecting the external interface to the gateway, and the gateway itself, including its interfaces, are also real-time-capable.

The execution environment—in particular, a virtual machine or virtual hardware—the switching unit, the external interface, as well as the gateway, including the interfaces contained therein, may, in particular, be implemented in the form of software and/or hardware, which is a product that can be sold independently. In light of the above, the invention therefore also relates to a computer program product having machine-readable instructions, which, if executed on a computer, a control unit, or other hardware, give the computer, the control unit, or the other hardware the functionality of a platform according to the invention and/or the functionality of a gateway contained therein in the sense of the descriptions above.

FIG. 1 shows, by way of example, an industrial installation 100 in which an industrial field device 101 is controlled via a platform 1 according to the invention. On an industrial PC 30, an operating system 33 runs with an abstraction layer 34, which provides generic system calls to the switching unit 5 and the virtual machine 32 independently of the specifically used operating system 33. In the virtual machine 32, the control software 2 runs and accesses, via a first communication standard 61, virtual hardware 31 as if it were the field device 101. The industrial PC 30 forms, with the external interface 4 and the inner layers 31, 32, 33, and 34, the execution environment 3 for the control software 2.

The switching unit 5 converts the data traffic from and to the virtual hardware 31 to the second communication standard 62, which is applicable within the network 41 of the industrial installation 100. The connection to the network 41 is established via the external interface 4. The network 41 is an Ethernet network with shared medium 42.

The data traffic between the external interface 4 of the industrial PC 30 and the first interface 71 of the gateway 7 is packet-switched via the network. The connection to the field device 101 is provided via the second interface 72 of the gateway 7 according to a third communication standard 63. The gateway 7 is designed to continuously monitor a measured value 102 supplied by the field device 101 and to send an event 103 via the first interface 71 to the human-machine interface 43 of the industrial installation 100 when a predetermined criterion 102a exists. Via the human-machine interface 43, the gateway 7 and the field device 101 can also be directly operated remotely if the industrial PC 30 is not running.

The gateway 7 forms, together with the execution environment 3, the platform 1 for actuating the field device 101. In addition to the industrial PC 30, the human-machine interface 43, and the gateway 7, a substitute I/O system 104 and a further control unit 105 are connected to the network 41.

Figure 2:
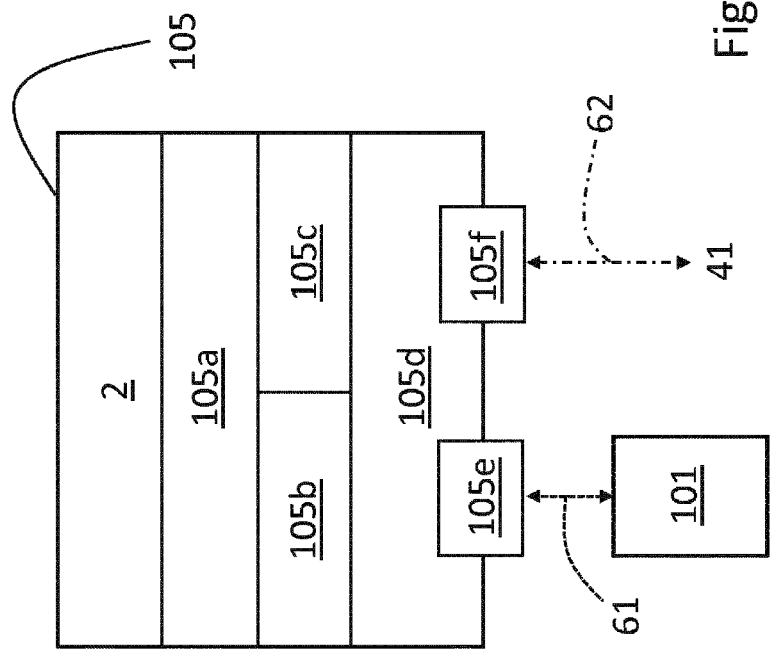
FIG. 2: Control unit 105 according to the prior art, for comparison.

In comparison, FIG. 2 shows the structure of a further control unit 105, and the connection of this control unit 105 to the field device 101 and to the network 41 according to the prior art. The control software 2 runs in an execution environment 105a, which in turn runs on an operating system 105b and uses proprietary hardware drivers 105c. The operating system 105b and the hardware drivers 105c access the proprietary hardware 105d, which comprises a first interface 105e for communication with the field device 101 via the first communication standard 61 and a second interface 105f for connection to the network 41, in which the second communication standard 62 is applicable.

In contrast to FIG. 1, the various components of the control unit 105 build on one another and interact, but are not abstracted from one another and encapsulated. Any change in the hardware 105d necessitates a change in the hardware drivers 105c. Changing the hardware 105d to a new hardware architecture, at the latest, also necessitates changes to the operating system 105b. The modified hardware drivers 105c make it necessary to adapt the control software 2 that accesses these hardware drivers 105c. A change of the operating system 105b due to the change of the hardware architecture involves further changes to the control software 2 and the execution environment 105a on which this control software 2 runs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Platform
2 Control software
3 Execution environment
30 Physical hardware for execution environment 3
31 Virtual hardware in virtual machine 32
32 Virtual machine running on operating system 33
33 Operating system running on hardware 30
34 Additional abstraction layer for operating system 33
4 External interface
41 Network of industrial installation 100
42 Shared medium of network 41
43 Human-machine interface of industrial installation 100
5 Switching unit
61, 62, 63 Communication standards
7 Gateway
71, 72 Interfaces of the gateway 7
100 Industrial installation
101 Field device
102 Measured value from field device 101
102$a$ Criterion for measured value 102
103 Event triggered according to criterion 102$a$
104 Substitute I/O system
105 Further control unit
105$a$ Execution environment in the control unit 105
105$b$ Operating system of the control unit 105
105$c$ Proprietary hardware drivers of the control unit 105
105$d$ Proprietary hardware of the control unit 105
105$e$, 104$f$ Network interface of the control unit 105

What is claimed is:

1. A platform for actuation of at least one industrial field device in an industrial installation having control software, comprising:
an execution environment, in which the control software is runnable; and
an external interface configured to communicate between the control software and the at least one industrial field device,
wherein the execution environment has virtual hardware which, from a point of view of the control software, behaves in a manner of the at least one industrial field device,
wherein a switching unit is connected between the virtual hardware and the external interface, the switching unit being configured to bidirectionally translate data, interchanged between the control software and the virtual hardware, for communication with the at least one industrial field device via the external interface
wherein the execution environment is specific to a type of control unit for which the control software was written,
wherein the virtual hardware is specific to an actuated industrial field device of the at least one industrial field device, and
wherein the switching unit is specific to a combination of the actuated field device and a communication standard used for connection via the external interface, but is independent of the type of control unit for which the control software was written.

2. The platform according to claim 1, wherein the execution environment comprises a virtual machine which in turn runs on hardware in a manner mediated by an operating system.

3. The platform according to claim 1, wherein the virtual hardware, the switching unit, and/or the virtual machine interact with the operating system via an additional abstraction layer.

4. The platform according to claim 1, wherein the execution environment is configured to execute control software present in a standardized language according to IEC 61131-3 or in a proprietary control program language.

5. The platform according to claim 1, further comprising an additional gateway which is connected to the external interface via a first interface and to the at least one industrial field device via a second interface.

6. The platform according to claim 5, wherein the gateway is configured to bidirectionally translate between a communication standard of the external interface and a communication standard of the field device.

7. The platform according to claim 5, wherein the first interface and the external interface are connected via a network to a shared communication medium.

8. The platform according to claim 7, wherein the gateway is configured to monitor at least one measured value determined by the designed field device and to communicate an event via the network when the at least one measured value meets a predetermined criterion.

9. The platform according to claim 7, wherein the gateway is configured to bidirectionally communicate, via the network, with a human-machine interface.

10. The platform according to claim 5, wherein the gateway comprises an automation technology control unit configured as a gateway by modifying a firmware thereof to its specific functionality.

11. The platform according to claim 2, wherein the execution environment and the gateway mediated by a same operating system run on the same hardware.

12. The platform according to claim 2, wherein the hardware comprises an industrial PC, an automation technology control unit, or a programmable logic controller.

13. The platform according to claim 2, wherein the operating system is real-time-capable.

14. A computer program product containing machine-readable instructions which, if executed on a computer, a control unit, or other hardware, give the computer, the control unit, or the other hardware the functionality of the platform according to claim 1.

15. A computer program product containing machine-readable instructions which, if executed on a computer, a control unit, or other hardware, give the computer, the control unit, or the other hardware the functionality of the platform according to claim 1 and the functionality of a gateway contained therein.

16. A computer program product containing machine-readable instructions which, if executed on a computer, a control unit, or other hardware, give the computer, the control unit, or the other hardware the functionality of the platform according to claim 1 or the functionality of a gateway contained therein.

17. The platform according to claim 4, wherein the proprietary control program language comprises ASEA Master Programming Language or Taylor Control Language.

* * * * *